(12) United States Patent
Cui

(10) Patent No.: US 8,470,055 B2
(45) Date of Patent: Jun. 25, 2013

(54) COMBINED PROCESS FOR PREPARING CALCINED SODA BY APPLYING SURFACE ENGINEERING TECHNOLOGY TO NATURAL SODA PREPARATION

(76) Inventor: Huaiqi Cui, Inner Mongolian Autonomous Reg. (CN)

( * ) Notice: Subject to any disclaimer, the term of this patent is extended or adjusted under 35 U.S.C. 154(b) by 368 days.

(21) Appl. No.: 12/898,222

(22) Filed: Oct. 5, 2010

(65) Prior Publication Data

US 2011/0027152 A1    Feb. 3, 2011

Related U.S. Application Data

(63) Continuation-in-part of application No. PCT/CN2009/071178, filed on Apr. 7, 2009.

(30) Foreign Application Priority Data

Apr. 7, 2008   (CN) .......................... 2007 1 0194348

(51) Int. Cl.
    *C01D 5/00*    (2006.01)
(52) U.S. Cl.
    USPC .......................................... 23/302 T; 23/303
(58) Field of Classification Search
    USPC .................... 23/302 T, 295 R, 302 R, 303
    See application file for complete search history.

(56) References Cited

U.S. PATENT DOCUMENTS 5,275,794 A    1/1994  Luna

FOREIGN PATENT DOCUMENTS

| CN | 1270925 A | 10/2000 |
| CN | 1522961 A | 8/2004 |
| CN | 101367531 A | 2/2009 |

OTHER PUBLICATIONS

International Search Report: PCT/CN2009/071178.

*Primary Examiner* — Edward Johnson
(74) *Attorney, Agent, or Firm* — Ladas & Parry LLP

(57) ABSTRACT

The invention relates to a combined process for preparing a calcined soda from a natural soda containing sodium chloride, soda and sodium sulphate, which comprises steps: (a) dissolving the natural soda to prepare an aqueous solution; (b) obtaining sodium carbonate decahydrate crystals from the natural soda solution by using a separation method of attaching crystallization; and (c) treating the obtained sodium carbonate decahydrate crystals to obtain the calcined soda. The selection to raw materials in the combined process is widened, and the associated minerals, such as sodium chloride, soda and sodium sulphate, can be separated as simple substances. The species of the obtained calcined soda and anhydrous sodium sulphate are abundant, and their purities are high. Moreover, the entire processes can be recycled, and there is no discharge of smoke, dust, waste liquid and so on.

33 Claims, 10 Drawing Sheets

COMBINED PROCESS FOR PREPARING CALCINED SODA BY APPLYING SURFACE ENGINEERING TECHNOLOGY TO NATURAL SODA PREPARATION

FIELD OF THE INVENTION

The present invention relates to a combined process for preparing a calcined soda from a natural soda, and particularly to a combined process for preparing a calcined soda by applying surface engineering technology, and mainly using a separation method of attaching crystallization, a method of atomizating at a high pressure and concentrating, a method of atomizating at a high pressure and carbonating, and a method of atomizating at a high pressure and absorbing ammonia to separate a mixed solution of sodium chloride, soda and sodium sulphate by steps, and calcining and decomposing sodium carbonate and sodium bicarbonate semi-finished products by using a calcining pipe where substances are brushed, scattered, blasted and calcined.

DESCRIPTION OF THE RELATED ART

Nowadays, the production of a calcined soda adopts a conventional ammonia-soda process and the multi-effect process of evaporating concentrating. In the ammonia-soda process, a refined sodium chloride is used as a raw material, and is subjected to ammonification and carbonation to produce sodium bicarbonate, which is then calcined to produce a calcined soda. The multi-effect process of evaporating and concentrating allows the raw material of a natural soda containing sodium carbonate with high purity to be subjected to conventional evaporation and concentration so that anhydrous sodium carbonate is precipitated, then is calcined to produce the calcined soda. Both the methods for preparing the calcined soda are characterized by a high investment for equipments, high energy consumption, numerous procedures, complex technical requirements, massive manpower consumption, high labor intensity, and a long production period, and the environmental pollution due to waste water and waste gas is serious as well. Moreover, the selection to the raw material is quite rigid. In the case of producing a calcined soda with high purity, it is necessary to select a refined brine or a raw material rich in sodium carbonate as a single component. This selection limits the production of the calcined soda. In view of the status of the natural soda reserve throughout the world, most of the natural soda is an associated mineral, that is, sodium chloride, soda and sodium sulphate exist blendedly and concomitantly, so it is quite difficult to perform purification and separation by the previous methods. As a result, the usability of the natural soda as a raw material is decreased greatly. Until now, the separation of sodium chloride, soda and sodium sulphate is still a problem in the field of natural soda, which inhibits the development of the processing industry of the natural soda throughout the world.

SUMMARY OF THE INVENTION

The embodiments of the present invention improve the conventional manufacturing technology, and separate, purify and convert the sodium chloride, soda and sodium sulphate from the associated minerals of the natural soda through a separation method of attaching crystallization, a method of atomizating at a high pressure and concentrating, a method of atomizating and carbonating at a high pressure, and a method of atomizating and absorbing ammonia at a high pressure. Accordingly, the invention can achieve the following objects: widening the selection to raw materials in the production of the calcined soda, achieving separation and purification of the associated minerals, and increasing the usability of the sources; applying surface engineering technology into the production of natural soda, increasing the rate of physical conversion and chemical conversion of materials, and increasing the efficiency of the conversion; and simplifying the processes, shortening production flow, decreasing cost, saving energy and manpower, utilizing the natural resource sufficiently, and changing a highly polluted production into an environment friendly production.

Accordingly, the invention provides a combined process for preparing the calcined soda from a natural soda containing a mixture of sodium chloride, soda and sodium sulphate, which comprises: (a) preparing an aqueous solution of the natural soda; (b) separating sodium carbonate decahydrate crystals from the natural soda solution by using a separation method of attaching crystallization; and (c) treating the obtained sodium carbonate decahydrate crystals to obtain the calcined soda.

According to one embodiment of the invention, in step (c), the sodium carbonate decahydrate crystals obtained in step (b) are self-dissolved by heating, then crystallized at a temperature of $\geq 109°$ C. as anhydrous sodium carbonate crystals. A solution remained after the sodium carbonate decahydrate crystals have been separated out in step (b) is atomized at a high pressure, and $CO_2$ is introduced so that sodium carbonate therein is converted into sodium bicarbonate, which is crystallized and separated to obtain sodium bicarbonate crystals and a remained solution, or is stirred to obtain a sodium bicarbonate crystal slurry. The solution remained after sodium bicarbonate has been separated out is concentrated, and is subjected to attaching crystallization and separated to obtain sodium sulphate decahydrate crystals. The solution remained after sodium sulphate decahydrate crystals have been separated out absorbs ammonia by atomizing at the high pressure, and is carbonated by atomizing at the high pressure, so as to convert sodium chloride therein into sodium bicarbonate crystals or a sodium bicarbonate crystal slurry.

According to one embodiment of the invention, in step (c), the sodium carbonate decahydrate crystals obtained in step (b) are self-dissolved by heating, then recrystallized at a temperature of 34.5° C.-109° C., preferably 50-100° C. to obtain sodium carbonate monohydrate crystals, which are separated, or are naturally effloresced to prepare the calcined soda at a temperature of 0-34° C., preferably 10-32° C. The solution remained after the sodium carbonate decahydrate crystals have been separated out is recycled to the natural soda solution, so as to perform further attaching crystallization.

The embodiment further comprises performing concentration by evaporating, and crystallization at a low temperature of 35.4° C.-50° C., so that sodium carbonate remained in a solution from which the sodium carbonate monohydrate crystals have been separated out is crystallized as sodium carbonate monohydrate crystals, which are separated from sodium sulphate still remained in the solution and a remained solution is obtained. The remained solution after the sodium carbonate monohydrate crystals have been separated out is further concentrated, and is subjected to attaching crystallization and separated to prepare sodium sulphate decahydrate crystals. The solution remained after the sodium sulphate decahydrate crystals have been separated out absorbs ammonia by atomizing at the high pressure, and is carbonated by atomizing at the high pressure, so as to convert sodium chloride therein into sodium bicarbonate crystals or a sodium bicarbonate crystal slurry.

According to one embodiment of the invention, the anhydrous sodium carbonate crystals, the sodium carbonate monohydrate crystals and the sodium bicarbonate crystals prepared above are calcined to prepare the calcined soda. The sodium bicarbonate crystal slurry is decomposed in a liquid state by atomizing at the high pressure and dried to prepare the calcined soda.

According to one embodiment of the invention, the attaching crystallization of said sodium sulphate decahydrate crystals is preferably performed at a solution concentration of 8-56.7% and at a temperature of 0° C.-32.4° C. Preferably, said sodium sulphate decahydrate crystals are naturally effloresced to prepare anhydrous sodium sulphate at a temperature of 0-34° C., more preferably 10-32° C.

According to one embodiment of the invention, among the atomization at a high pressure, the concentration by atomizing at a high pressure, ammonia absorption by atomizing at a high pressure, carbonation by atomizing at a high pressure, the decomposition in a liquid state by to atomizing at a high pressure and drying by atomizing at a high pressure, the pressure of a spray gun for the atomization at a high pressure is 20 kg/cm$^2$-60 kg/cm$^2$.

According to one embodiment of the invention, the separation method of attaching crystallization preferably uses an attaching crystallizer having a netted fibre structure.

According to one embodiment of the invention, said calcination is preferably performed in a calcining pipe where substances are brushed, scattered, blasted and calcined, which comprises: providing a hot blast with a wind pressure of 5000 Pa and a temperature of equal to or above 200° C. in the calcining pipe; introducing the substances into the calcining pipe; allowing the substances to be brushed, scattered, calcined and blown, followed by being rapidly dried and/or decomposed in the calcining pipe; recycling the substances having a high water content and a large particle size into the calcining pipe to perform brushing, scattering, calcining and blowing; blowing heavy calcined soda obtained after drying into an accumulation silo; and performing cyclone separation to dust-like substances to obtain light calcined soda.

According to another embodiment of the invention, said calcination, and said drying by atomizing at a high pressure are performed in a drying column having two functions and two effects, respectively.

According to one embodiment of the invention, said natural soda solution preferably has a temperature of 0° C.-35° C. and a concentration of 6%~32.9%.

According to another embodiment of the invention, said natural soda solution preferably has a temperature of −2.1° C.-32° C., preferably −2.1° C.-20° C., and a concentration of 5.9%-31.3%.

DETAILED DESCRIPTION OF THE PREFERRED EMBODIMENTS

Figure 1:
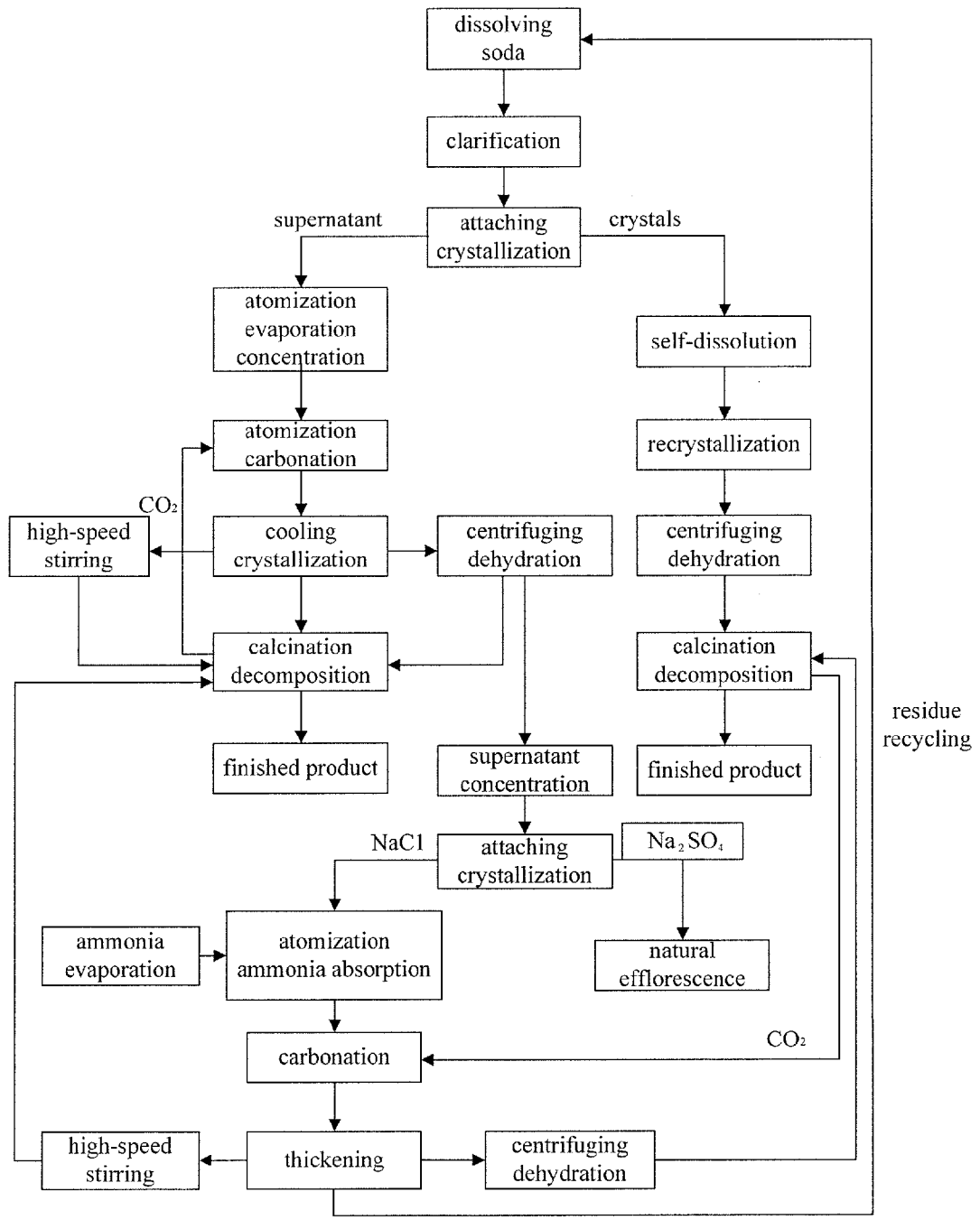
FIG. 1 is an exemplary process flow diagram of a combined process for preparing a calcined soda according to one embodiment of the invention.

According to one embodiment of the invention, the objects of the invention are achieved by the following processes.

A clear soda solution is prepared from a natural soda with a concentration of about 30% by a conventional dissolving and clarifying method.

The mother liquor of the natural soda is introduced into a cold separating pool under the ground having a depth of about 1 m (the specification of the cold separating pool is determined according to the requirement of practical production, and the cold separating pool under the ground serves to decrease the influence of the environment temperature on the soda solution and to facilitate operation), so that the liquid level of the soda solution slowly rises upward in the cold separating pool. According to one embodiment, the concentration of the soda solution may be 6%~32.9%, and the temperature of the soda solution may be 0° C.-35° C. According to another embodiment, the concentration of the soda solution may be 5.9%~31.3%, and the temperature of the soda solution may be −2.1° C.-32° C. The soda solution that rises slowly contacts fibre ropes on the crystallizer inside the pool, and sodium carbonate having the minimum solubility firstly attaches to the ropes rapidly as crystal seeds. The crystal seeds continuously attract homogeneous solutes to attach thereto, so that the crystals on the ropes grow gradually. During crystallization, since the separating pool is underground, the temperature of the solution in the separating pool decreases continuously, and the solubilities of the solutes in the solution decrease as the temperature of the solution decreases, which further facilitates the separation of the crystals. To prevent the crystallization of other solutes, the solution is discharged just after the content of sodium carbonate in the solution decreases to a certain degree, and the discharged solution is processed by an atomizing converter to convert the remained sodium carbonate into sodium bicarbonate.

Sodium carbonate crystals crystallized on the crystallizer are sodium carbonate decahydrate. The sodium carbonate decahydrate crystals would dissolve in their own crystal water to become a solution containing about 37% of sodium carbonate when the environment temperature is above 34° C. The sodium carbonate solution is heated to boil, and crystallized at temperature of ≧109° C. in a device where atomization, concentration and crystallization are performed sequentially, to separate out anhydrous sodium carbonate crystals.

Anhydrous sodium carbonate crystals are introduced into a calcining pipe where substances are brushed, scattered, blasted and calcined, and water therein is evaporated to prepare heavy calcined soda particles.

It is inconvenient to precisely separate the solution with low concentration discharged from the cold separating pool by a cold separation method and a separation method of concentrating due to the decreased content of sodium carbonate. Thus, a chemical conversion method, i.e. a method of atomizing and carbonating at a high pressure is adopted to convert the remained sodium carbonate to sodium bicarbonate. Since the solubility of sodium bicarbonate is relatively low and sodium bicarbonate tends to be easily separated from sodium sulphate and sodium chloride, thus the separation of soda from other solutes is achieved.

Sodium bicarbonate that is prepared by the conversion of the atomizing converter is decomposed by the calcination in the calcining pipe to prepare a light calcined soda.

Without a centrifugal dehydration process, sodium bicarbonate that is prepared by the atomizing converter is prepared into a slurry in a high-speed stirrer, which is then pumped into a drying column by atomizing at a high pressure with a high-pressure slurry pump and decomposed into spherical calcined soda particles by convective drying and calcination.

The solution containing sodium chloride and sodium sulphate that has been separated from sodium bicarbonate is rapidly concentrated by an atomizing evaporator, followed by extracting sodium sulphate by the attaching crystallization method to achieve the separation of sodium chloride from sodium sulphate at a temperature of 0° C.-32.4° C. and a concentration of 8%-56.7% in the solution.

Since sodium sulphate is not suitable for being produced with energy consumed due to its value, sodium sulphate crystals on the crystallizer may be disposed in a space with an environment temperature of equal to or above 0° C. and equal to or less than 34° C., preferably 10° C. to 32° C., to allow it to be naturally effloresced and dried to prepare a finished product of anhydrous sodium sulphate.

The separated sodium chloride solution absorbs ammonia and is carbonated by using the high-pressure atomization technique to convert sodium chloride therein to sodium bicarbonate, which is calcined to prepare the light calcined soda.

The crystals on the crystallizer are effloresced and dried by the method of natural efflorescence to prepare the calcined soda and anhydrous sodium sulphate. As an improvement to the conventional ammonia-soda process, the atomization technique is applied to ammonia evaporation, ammonia absorption and carbonation to prepare the calcined soda.

In general, as shown in FIG. 1, according to the above embodiment of the invention, sodium carbonate decahydrate crystals are separated out by dissolving a natural soda containing a mixture of sodium chloride, soda and sodium sulphate into water (dissolving soda) and clarifying to prepare an aqueous solution with a certain concentration, and performing attaching crystallization at a certain temperature. Then, the sodium carbonate decahydrate crystals are self-dissolved by heating, then boiled and crystallized, followed by centrifugal dehydration to obtain anhydrous sodium carbonate crystals, which are calcined to prepare the finished product of calcined soda.

As for the remained supernatant after sodium carbonate decahydrate crystals have been separated out, it is atomized at a high pressure, evaporated, concentrated and carbonated to convert remained sodium carbonate therein into sodium bicarbonate having lower solubility, followed by cooling crystallization and separation by centrifugal dehydration, or by high-speed stirring to obtain a crystal slurry, which is then calcined and decomposed so as to prepare the calcined soda. The centrifugally dehydrated supernatant is concentrated, followed by attaching crystallization to separate sodium sulphate decahydrate crystals, which are naturally effloresced to prepare anhydrous sodium sulphate.

The remained solution mainly contains sodium chloride, in which sodium chloride is converted to sodium bicarbonate to prepare crystals or a crystal slurry by absorbing ammonia by atomizing at a high pressure and being carbonated by atomizing at a high pressure, followed by being calcined to prepare the calcined soda.

Figure 4:
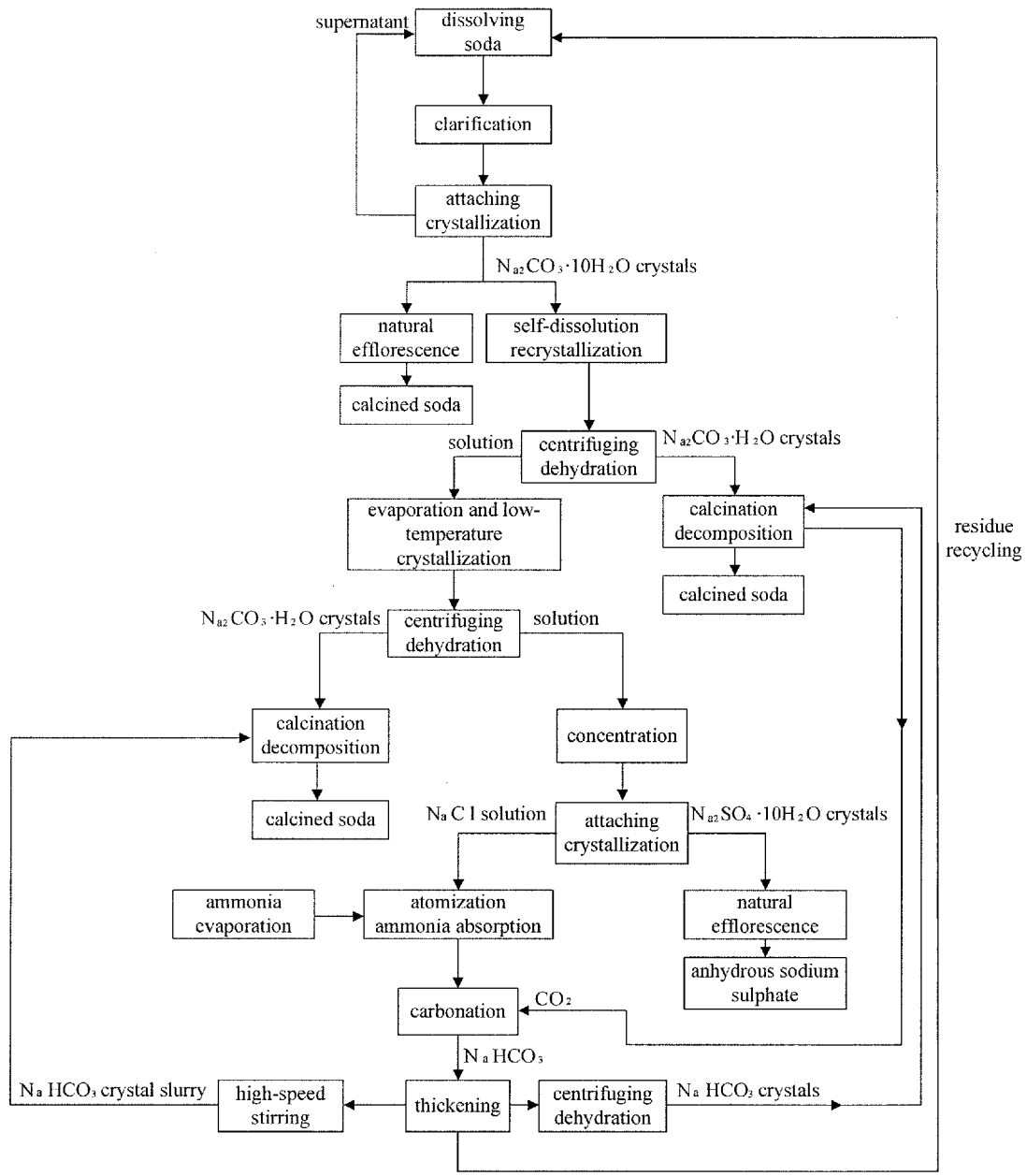
FIG. 4 is an exemplary process flow diagram of a combined process for preparing a calcined soda according to another embodiment of the invention.

According to another embodiment of the invention, as shown in FIG. 4, a natural soda solution is subjected to attaching crystallization to separate sodium carbonate decahydrate crystals. When the content of sodium carbonate in the solution is less than a certain level, the solution is discharged immediately, and then a new concentrated solution is introduced to repeat the processes until the crystals attached meet the required degree. The discharged solution having a low concentration is returned to the mother liquor of the natural soda to further separate the remained soda therein.

Sodium carbonate decahydrate crystals that have been separated out by attaching crystallization may be naturally effloresced to directly prepare the calcined soda at a temperature of equal to or above 0° C. and equal to or less than 34° C., preferably 10-32° C., or may be self-dissolved by heating, then crystallized at temperature of 35.4° C.-109° C., preferably 50° C.-100° C. In the environment of 35.4° C.-109° C., the hydration characteristic of sodium carbonate decahydrate crystals changes, which results in changing in arrangement orders of the lattice structure. The soda would be separated out as sodium carbonate monohydrate when the concentration of the solution is more than 30.8%, thus obtaining sodium carbonate monohydrate crystals immediately. The crystals obtained by centrifugally dehydrating are decomposed by calcination to prepare the calcined soda.

Figure 6:
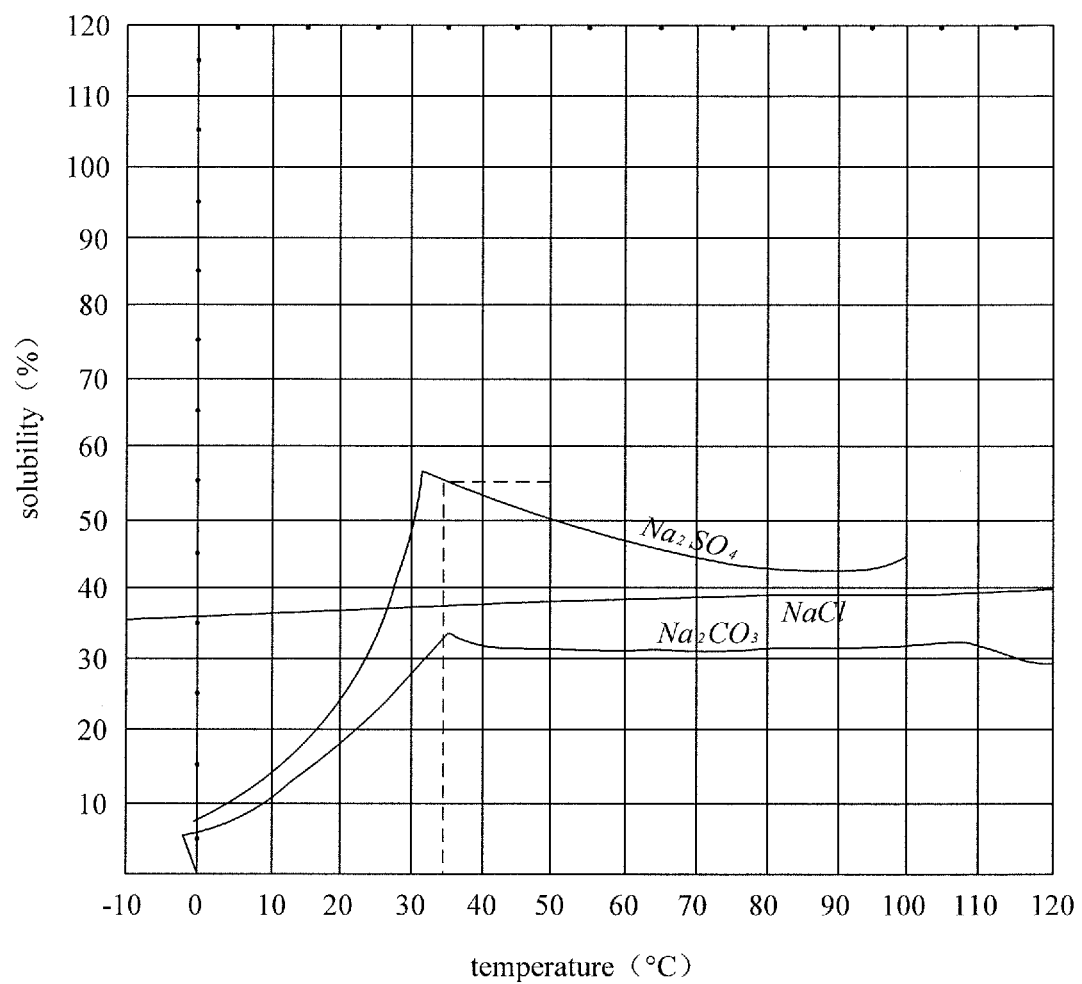
FIG. 6 is a phase diagram of $Na_2CO_3$—$Na_2SO_4$—$H_2O$ system.

A little amount of sodium sulphate and sodium chloride are crystallized together with sodium carbonate decahydrate crystals that have been separated by attaching crystallization. Thus, the solution separated out by the process of self-dissolving and crystallizing contains sodium sulphate. If the content of sodium sulphate is more than 3%, sodium sulphate would crystallize from the solution by forming a complex sodium chloride ($2Na_2SO_4.Na_2CO_3$). The separation of soda from sodium sulphate is hardly achieved by a conventional evaporation method. Thus, the crystallization of sodium carbonate monohydrate is facilitated by concentrating by evaporating, crystallizing at the low temperature and selecting a temperature range with the maximum solubility difference therebetween, so as to achieve the separation of soda from sodium sulphate. FIG. 6 is a phase diagram of $Na_2CO_3$—$Na_2SO_4$—$H_2O$ system. As shown in FIG. 6, the range of 35.4° C.-50° C. is the region having the maximum solubility difference between sodium carbonate and sodium sulphate, so the crystallization and separation of sodium carbonate monohydrate are performed in this temperature range.

The solution containing sodium chloride and sodium sulphate that has been separated from sodium carbonate monohydrate is evaporated and concentrated, followed by performing attaching crystallization to separate sodium sulphate decahydrate and being naturally effloresced to prepare anhydrous sodium sulphate according to above methods.

Finally, sodium chloride in the remained solution is converted to sodium bicarbonate, which is then separated and calcined to decompose to calcined soda.

In general, in the above embodiments of the invention, sodium carbonate decahydrate crystals separated by the attaching crystallization method are self-dissolved by heating, then recrystallized to obtain sodium carbonate monohydrate crystals, and the solution separated out is then concentrated by evaporating, and crystallized in the temperature region of 35.4° C.-50, in which the solubility difference between soda and sodium sulphate is maximum, to separate out sodium carbonate monohydrate crystals, thus achieving the separation of soda from sodium sulphate. Thereby, the finished product with higher purity is obtained.

It can be known from the above description that the combined process for preparing the calcined soda according to the invention achieves the separation of sodium chloride, soda and sodium sulphate, and produces light calcined soda powders, light spherical calcined soda particles, heavy calcined soda particles and anhydrous sodium sulphate, according to the different demands of the market. The obtained products have various types and high purity. The whole preparation process can be recycled, and the problems of environment pollution relating to emitting smoke, dust, waste liquid and the like are avoided.

The method of the invention will be described in more details by the following examples. However, these examples are only for illustrative, and are not intended to limit the protection scope of the invention.

Example 1

I. Cold separating treatment of sodium chloride, soda and sodium sulphate by the attaching crystallization method.

A natural soda is prepared into an aqueous solution with a concentration of about 30% by a conventional dissolving and clarifying method. The apparatus for performing attaching crystallization comprises the following three parts. 1. A cold separating pool under the ground: the cold separating pool under the ground has a depth of about 1 m (which is not appropriate to be too large due to the influence of a liquid pressure during crystallization), a width of about 3 m and a length of about 20 m, which is convenient to operate and capable of being enlarged in capacity. 2. Attaching crystallizer: the attaching crystallizer is a frame made of angle iron with a dimension of about 1 m×1 m×2.7 m. Fine reinforcing steel bars are welded on the top and bottom of the frame at an interval of 1 cm, and the fine reinforcing steel bars on the top are parallel to and respectively correspond to those on the bottom. Fine fibre ropes are tied on each reinforcing steel bars on the top at an interval of 1 cm and are connected to the corresponding one on the bottom. The total length of the fibre ropes tied to each crystallizer is about 25,000 m, thereby the surface area for attaching crystallization is enlarged. The weight of the crystals crystallized in each crystallizer is more than 1000 kg within 8-12 hours. The crystallizers are arranged closely side by side. 3. Sliding hoist crane (electric hoist): the sliding hoist crane is an electric hoist that can slide back and forth along a fixed track on the top of the separating pool, so as to send the crystallizer in and out. It requires 10 separating pools, 200 crystallizers, and a total length of the fibre ropes of more than 5000,000 m, calculated according to the production of the light calcined soda over 100 ton per day. The processing procedures are as follows. The clear soda solution is introduced into the cold separating pool, so that the liquid level of soda solution slowly rises upward in the pool. The risen soda solution contacts the fibre ropes of the crystallizer. Sodium carbonate having the minimum solubility firstly attaches to the ropes rapidly as crystal seeds. The crystal seeds continuously attract homogeneous solutes to attach thereto, so that the crystals on the crystallization ropes grow gradually. The liquid in the pool is discharged when the crystals grow to a certain degree. The crystallizers are lifted out by the sliding hoist crane and transferred to the next process (the is obtained crystals are mainly sodium carbonate decahydrate crystals).

II. Self-dissolution and recrystallization (crystallization while boiling) of sodium carbonate decahydrate.

Figure 2:
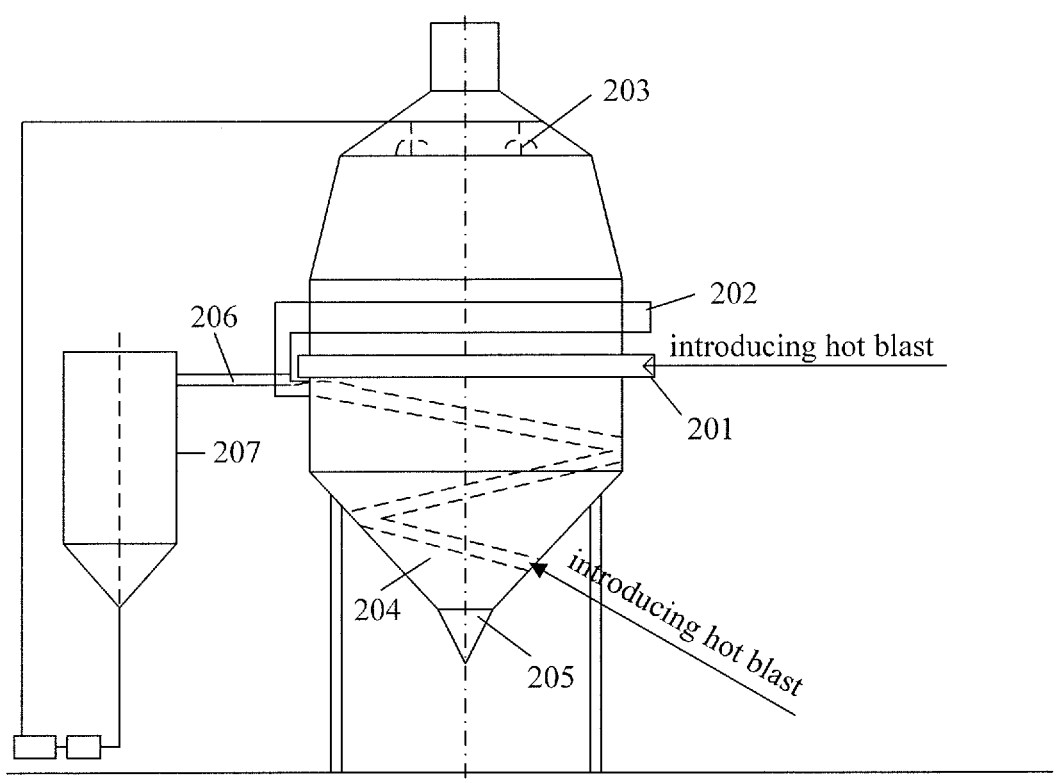
FIG. 2 is a schematic view of a device where atomization, concentration and crystallization are performed sequentially according to one embodiment of the invention.

The processing apparatus comprises the following two parts. 1. Self-dissolver: the self-dissolver is a device employed on the based of the characteristic that sodium carbonate decahydrate would dissolve in the crystal water of itself at an environment temperature of above 34° C. The device is a sealed hot evaporating room for dissolving sodium carbonate decahydrate by introducing hot gas, whose specification is determined according to the size of the crystallizer. 2. A device where atomization, concentration and crystallization are performed successively (as shown in FIG. 2): the device where atomization, concentration and crystallization are performed successively is an upright column, the exterior of which has a thermal insulating layer. Two regions are divided according to different functions: the upper and middle parts are evaporating and concentrating regions with two annular air inlets; and the lower part is a boiling and crystallizing region with one air inlet for providing heat source to a heat-conducting pipe in the crystallizing region (the total cross-sectional area of the bottom heating pipe is larger than that of the blast pipe of the hot-blast stove). The processing procedures are as follows in detail. The heat of the first hot-blast stove warms the solution via the heat-conducting pipe at the bottom of the crystallizer, and then the remained heat is conducted to the upper first annular air inlet 201. The heat of the second hot-blast stove is directly introduced into the second annular air inlet 202. The hot blast of the two annular air inlets forms a rising hot gas flow by the blowing force of the blower of the hot-blast stove and the attractive force of the induced draught fan on the top of the crystallizer. The rising hot gas flow and the atomized sodium carbonate solution dropping from the top high pressure spray gun 203 are convective and generate heat exchange, such that water is rapidly evaporated and the solution is rapidly concentrated. During the heat exchange process, the concentrated solution has an increased temperature and remains in the boiling and crystallizing region, where the temperature increases rapidly due to three rows of heating pipes, and anhydrous sodium carbonate crystals are separated out when the temperature reaches equal to or above 109° C. The separated anhydrous sodium carbonate is deposited on the bottom cone 204 and is discharged via the outlet 205. When the liquid level of the solution in the device where atomization, concentration and crystallization are performed successively is over the position of the overflow pipe 206, the solution flows into a high storage tank 207 via the overflow pipe automatically.

III. The chemical conversion of sodium carbonate in the mixed solution of sodium chloride, soda and sodium sulphate by carbonation by atomizing at a high pressure.

The processing apparatus is a carbonizer by atomizing at a high pressure, which is an upright column with a diameter of 1.5 m and a height of 15 m, and has a gas inlet for carbon dioxide at the bottom. The processing procedures are as follows. Carbon dioxide as the exhausted gas from decomposing sodium bicarbonate (referring to exemplary process IV) is introduced into the gas inlet at the bottom of the carbonizer via the induced draught fan. The carbon dioxide gas flow slowly rises upward with its velocity decreased, since the diameter of the carbonizer is bigger than that of the induced air pipe. Spray guns for the high-pressure atomization are installed in the upright column at an interval of 3 m from top to bottom. The soda solution atomized by the spray guns drops down as a spray and contacts the rising carbon dioxide gas. Carbon dioxide is dissolved in the sodium carbonate solution rapidly, and the following reaction occurs:

$$Na_2CO_3+CO_2+H_2O \rightarrow 2NaHCO_3+59.789 \text{ kj/mol}.$$

The sodium carbonate solution reacts with carbon dioxide gas as a spray, so on one hand, the gas-liquid contacting area is enlarged, and on the other hand, the liquid droplet in a spray state has decreased resistance to the rising gas flow, which is greatly beneficial for their rapid absorption and conversion. Moreover, during the reaction, carbon dioxide rising from the bottom flows upward continuously, so heat release has little influence on dissolving carbon dioxide in the liquid drops of sodium carbonate. Finally, such a solution containing sodium bicarbonate falls into the cone at the bottom of the converter, is discharged via the outlet, and then is cooled via a cooling bath. Sodium bicarbonate is rapidly crystallized and separated from other medias due to its little solubility.

IV. Blast air calcination of anhydrous sodium carbonate and blast air calcination decomposition of sodium bicarbonate.

Figure 3:
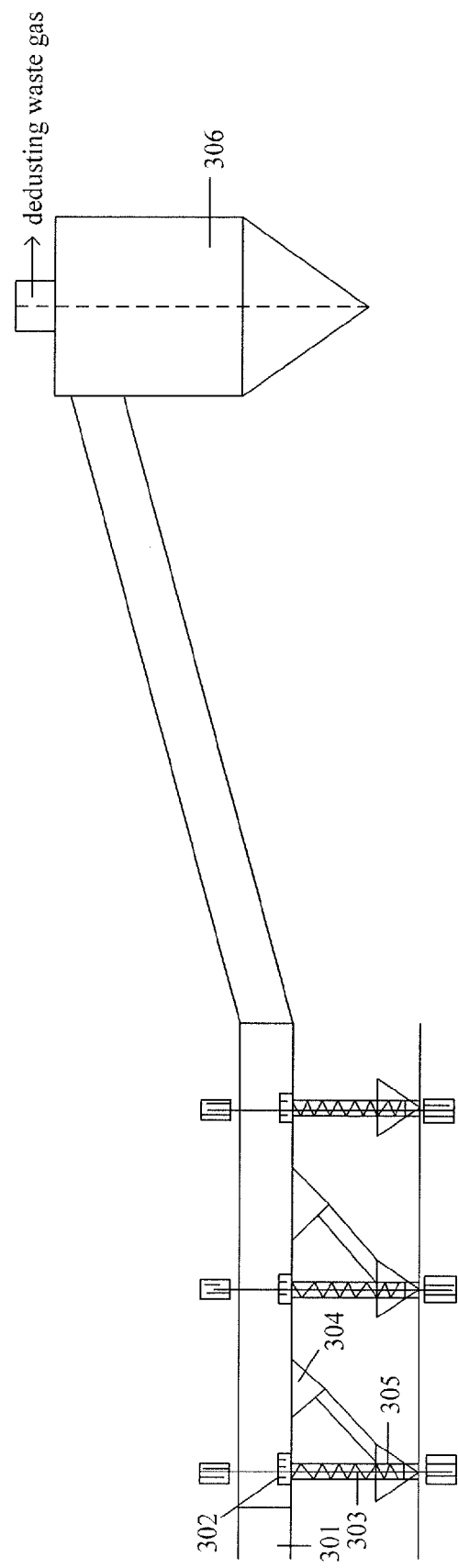
FIG. 3 is a schematic view of a calcining pipe where substances are brushed, scattered, blasted and calcined according to one embodiment of the invention.

The processing apparatus is a calcining pipe where substances are brushed, scattered, blasted and calcined (as shown in FIG. 3), which consists of a high-temperature blower 301, a high-speed stirring brush 302, an upright screw feeding machine 303, a temporary material holding tank 304, a bottom trough 305, an accumulation silo 306 and a cyclone deduster. The processing procedures are as follows in detail. The high temperature blower provides hot blast with a wind pressure of 5000 Pa and a temperature of equal to or above 200° C. for the calcining pipe. The materials are supplied uniformly from a material trough to the calcining pipe by the upright screw feeding machine. The materials fed into the calcining pipe are brushed and scattered by the high-speed stirring brush to enlarge the heating area. The materials after brushing and scattering are blown forward by the wind power and release water. Some materials with high water content and large particle size are deposited in the temporary material holding tank, since the wind power is not sufficient to support them. Then, the materials slide to the bottom trough via a chute, followed by being sent to the calcining pipe via a second group of upright screw feeding machine. After undergoing several times of brushing, scattering, and heating, the water in the materials is evaporated continuously. The materials held in the accumulation silo meet the requirement as a finished product, and the held materials are heavy calcined soda particles having a high specific gravity, the dust product with a low specific gravity is packaged after being separated by the cyclone separator. Such a calcining method is also suitable for the calcining decomposition of sodium bicarbonate, and the carbon dioxide gas discharged after decomposition can be provided for the above carbonizer by atomizing at a high pressure, thus achieving recycling.

V. Sodium bicarbonate crystallized and separated by process III is prepared to a sodium bicarbonate crystal slurry by high-speed stirring.

The following steps replace process IV to perform the calcination and decomposition by atomizing at a high pressure of the sodium bicarbonate crystal slurry, and the calcination and decomposition of sodium carbonate crystals and sodium bicarbonate crystals in the drying column. The processing apparatus is an upright drying column for heat exchange. The height should be relatively high in order to calcine and dry sufficiently. Generally, taking the production over 100 tons per day into consideration, the height is 25-30 m, the diameter is 5-7 m and the exterior portion has a thermal insulation layer. This apparatus can be used either for the high-pressure atomization of the thick sodium bicarbonate crystal slurry by the high-pressure spray gun, or for drying crystals by the method of brushing, scattering and diffusing. The processing procedures are as follows in detail. 1. The sodium bicarbonate crystal slurry stirred by the high-speed stirrer is sprayed into the drying column as a spray by the high-pressure spray gun, and falls down under the pushing actions of the spraying pressure and the gravity by itself. At the same time, heat exchange occurs between the hot gas moving from bottom to top and sodium bicarbonate, so sodium bicarbonate is thermally decomposed into sodium carbonate, carbon dioxide and water ($2NaHCO_3 \rightarrow Na_2CO_3+CO_2+H_2O$). Further, water is evaporated rapidly, and sodium carbonate is thermally expanded and dried to form hollow particles, which fall into the bottom collection funnel as the final product. Carbon dioxide and water vapour are pumped into the cyclone separator by the induced draught fan to separate soda dust, and are then introduced into the process for high-pressure atomization and carbonation. 2. After being centrifugally dehydrated, anhydrous sodium carbonate and sodium bicarbonate are transferred to the top of the drying column by a bucket elevator, and are uniformly fed to the tray for brushing and scattering by a material distributor. The tray for brushing and scattering is the bottom pan of a circular sieve with a diameter equal to or more than 2 m, where the material is uniformly leaked downwards by brushing and scattering of the high-speed stirring brush. Heat exchange occurs between the leaked materials and the hot gas moving from bottom to top, thus water is evaporated rapidly, and the materials are dried and decomposed rapidly to fall into the bottom collection funnel as the final product. Carbon dioxide gas and water vapour are pumped into the cyclone separator by the induced draught fan, and are then introduced into another process.

VI. Concentration and utilization of the remained bittern.

The processing apparatus is the same as the device where atomization, concentration and crystallization are performed successively. The remained bittern is atomized and exchanges heat with the hot gas flow, and water is evaporated rapidly. Then, the saturated solution after concentration is subjected to attaching crystallization to precipitate sodium sulphate decahydrate crystals. The sodium sulphate decahydrate crystals precipitated on the crystallizer are disposed to an aeration drying space to natural effloresce. The product is anhydrous sodium sulphate. Finally, the remained solution mainly contains sodium chloride.

According to the chemical property that sodium carbonate decahydrate or sodium sulphate decahydrate will rapidly effloresce in an aeration drying space with an environment temperature less than 32° C., sodium carbonate decahydrate or sodium sulphate decahydrate are disposed to a plant for natural efflorescence with the environment temperature of over 0° C. and less than 32° C. The plant for natural efflorescence is a semi-open plant established on an open place and allowing dried air to rapidly circulate. Metal sieve is used as an air filtrating wall enclosing the efflorescence plant in order to prevent impurities such as entrainment of sand particles by the wind from coming into the product, and the top of the plant is sealed by a sunlight board and is equipped with an induced draught device for exporting sufficient amount of air flow in order to keep the temperature of the efflorescence plant and to prevent impurities from coming in. Crystallizing nets are arranged closely side by side on the crystallizing support and are suspended in the plant, and the space between the crystallizing nets should be larger than 400 mm. The middle blasting passage is designed according to the area of the efflorescence plant, and the top of the blasting passage can be fabricated into a sealed arc glass canopy, the top of which is installed with several blasting devices according to the required air quantity. Sodium carbonate decahydrate or sodium sulphate decahydrate attached to the crystallizing nets is converted to anhydrous sodium carbonate or anhydrous sodium sulphate by the efflorescence, which falls off by shaking and is sieved and packaged.

VII. The conversion of sodium chloride solution by high-pressure ammonia absorption and carbonation.

The processing apparatus comprises an ammonia absorber by atomizing at a high pressure and a carbonizer by atomizing at a high pressure. According to the reaction principle of the equation, i.e. $NaCl+NH_3+CO_2+H_2O \rightarrow NaHCO_3 \downarrow +NH_4Cl$, the sodium chloride solution absorbs ammonia and carbon dioxide to generate sodium bicarbonate. Since the ammonia absorbing process and carbonizing process can not be performed simultaneously, ammonia is necessary to be absorbed firstly followed by absorbing carbon dioxide, thus two devices are required. The ammonia absorber by atomizing at a high pressure is the same as the carbonizer by atomizing at a high pressure described above. However, the carbonization of the sodium chloride solution containing ammonia should be performed at the environment temperature, since a sodium chloride solution containing ammonia can be decomposed by heat. The processing procedures are as follows in detail. A fine sodium chloride solution that has been atomized reacts with the rising ammonia gas fed from the bottom annular air inlet to generate a sodium chloride solution containing ammonia, and then the sodium chloride solution containing ammonia is atomized within the carbonizer to react with the rising carbon dioxide fed from the bottom air inlet to generate sodium bicarbonate. Sodium bicarbonate crystals are separated out from the cooled solution after reaction, which are decomposed to light sodium carbonate by calcination at a temperature of above 160° C. The processing of the sodium bicarbonate crystals or the crystal slurry adopts process IV or V.

Example 2

I. A natural soda solution is prepared by the same method as example 1, and is subjected to attaching crystallization to separate sodium carbonate decahydrate, except that the attaching crystallizer has a netted fibre rope structure of 100 cm×300 cm, and the device used therein also comprises a counter-roll breaker. The counter-roll breaker is a device that has a set of rolls having the same width as that of the crystallizing nets and grinds the crystals by opposite rotation. The crystals on the crystallizing net are ground by the counter-roll breaker, and are sent to the following process.

II. Self-dissolution and recrystallization of sodium carbonate decahydrate crystals.

Figure 5:
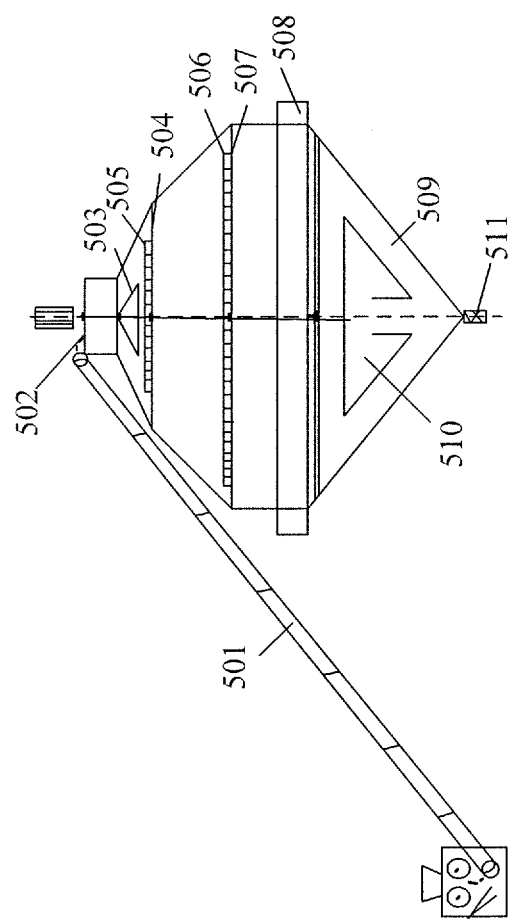
FIG. 5 is a schematic view of a self-dissolver according to one embodiment of the invention.

The processing apparatus is a self-dissolver, which is a device employed on the based of the characteristic that sodium carbonate decahydrate would be dissolved in the crystal water of itself at an environment temperature of above 32° C. (as shown in FIG. 5). The processing procedures are as follows. The ground material is transferred to inlet 502 by the belt conveyer 501, and is uniformly scattered on the first sieve tray 504 (the diameter of the mesh is 10 mm). Then, the material on the first sieve tray begins to dissolve under heating by the hot blast from the annular inlet 508, and falls to the second sieve tray 507 (the diameter of the mesh is 5 mm) by brushing and scattering of the equalization brush 505. The little broken crystals falling onto the second sieve tray are uniformly heated and rapidly dissolved by brushing, scattering and fricting of the equalizing brush 506. The soda solution falls into the crystallizing region 509 at the bottom of the self-dissolver, where the temperature is controlled to 35.4° C.-109° C. The self-dissolved soda solution is extremely supersaturated. Sodium carbonate monohydrate is rapidly separated out in the crystallizing region, and the crystal grains of the crystallized sodium carbonate monohydrate continuously grow under the action of the stirrer 510. Sodium carbonate monohydrate crystals are discharged from the outlet 511 when the amount thereof in the crystallizing region reaches a certain degree, and are fed to the following process after centrifuging dehydration.

III. The solution separated by the process of centrifuging dehydration is evaporated and crystallized at a low temperature to achieve the separation of sodium carbonate monohydrate from sodium sulphate.

Figure 7:
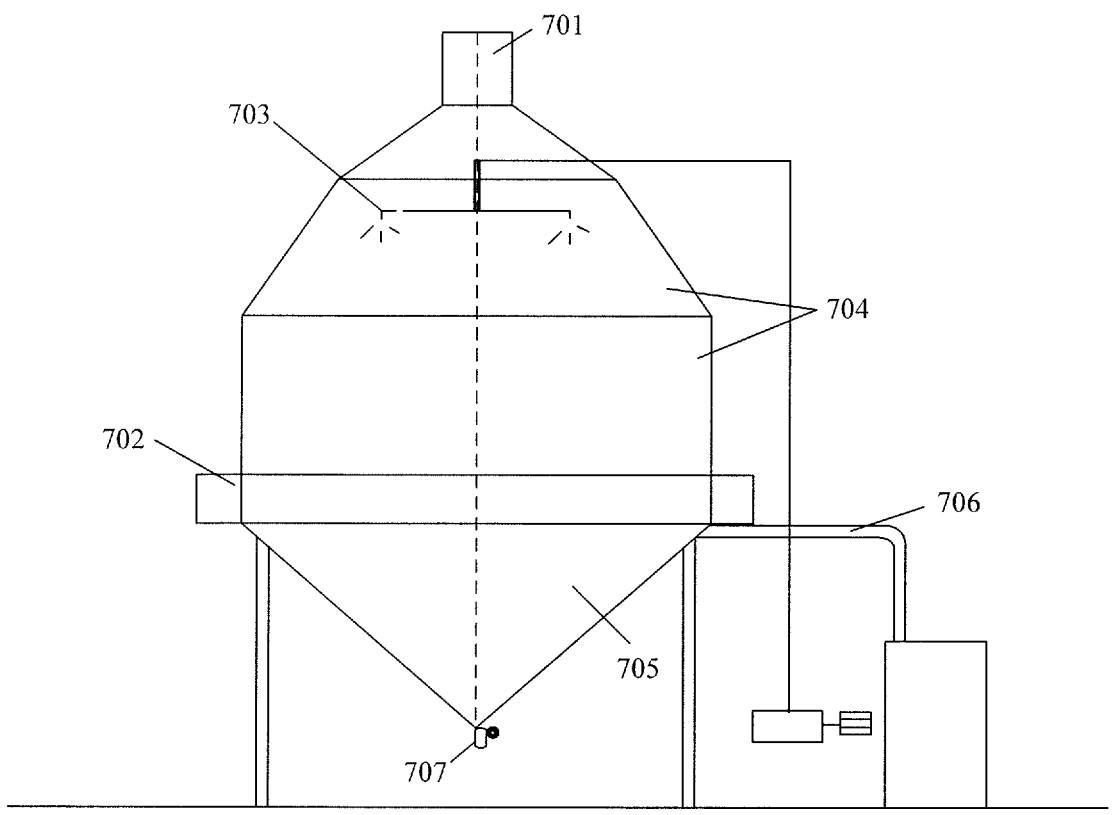
FIG. 7 is a schematic view of the device where concentration by evaporating and crystallization at a low temperature are performed according to one embodiment of the invention.

The content of sodium sulphate in the solution separated by process II increases continuously. It is hardly to separate sodium sulphate with a content of above 3% by a conventional evaporating method. From the analysis on the tendencies from the solubility curves of $Na_2CO_3$ and $Na_2SO_4$ in the phase diagram of $Na_2CO_3$—$Na_2SO_4$—$H_2O$ ternary system (FIG. 6), the optimal way to separate the two solutes in a liquid phase is to select a region with a maximum solubility difference therebetween, so that one of the two solutes is crystallized to achieve the separation. From the analysis on the solubility curves of the two solutes as shown in FIG. 6, when the solution temperature is kept in the range between 35.4° C. and 50° C., sodium carbonate has the solubility of 33.2%-30.8% and is crystallized as sodium carbonate monohydrate, and sodium sulphate has the solubility of 55%-50% and is crystallized as anhydrous sodium sulphate, thus the difference of solubility therebetween reaches 20%. Therefore, the separation of sodium carbonate monohydrate is achieved by concentration by evaporating and crystallization at a low temperature within the range. The processing apparatus is a device where concentration by evaporating and crystallization at a low temperature are performed (as shown in FIG. 7). The processing procedures are as follows. The hot gas is introduced into the apparatus via the annular air inlet 702 by the suction force of the induced air pipe 701, and the soda solution that has been atomized by the high-pressure spray gun 703 contacts the rising hot gas flow to generate effective evaporation in the apparatus. Water is evaporated rapidly in the atomizing and evaporating region 704. The concentrated soda solution is collected in the crystallizing region 705, where sodium carbonate monohydrate is precipitated out in the temperature range of 35.4° C.-50° C. The remained solution is recycled via the overflow port 706 after saturated storage, and the crystal slurry is discontinuously separated out. The obtained crystal slurry of sodium carbonate monohydrate is subjected to centrifuging dehydration to produce sodium carbonate monohydrate crystals and a solution containing sodium chloride and sodium sulphate.

IV. The solution containing sodium chloride and sodium sulphate separated out by evaporation under heating and crystallization at a low temperature is subjected to attaching crystallization to further separate sodium sulphate.

The solution containing sodium chloride and sodium sulphate separated out by evaporation under heating and crystallization at a low temperature is concentrated until the concentration of sodium sulphate reaches 8%-56.7%, followed by the same attaching crystallization process as process I to separate out sodium sulphate decahydrate crystals at the temperature of 0-32.4° C., thus achieving the separation of sodium chloride from sodium sulphate.

V. Sodium sulphate decahydrate on the attaching crystallizer is naturally effloresced at a temperature of 0-32° C. by the same method as example 1 to prepare anhydrous sodium sulphate.

Sodium carbonate decahydrate obtained from above process I can be naturally effloresced under the same conditions to prepare the calcined soda product directly.

VI. The remained solution after sodium sulphate decahydrate has been separated out mainly contains sodium chloride, which is converted to sodium bicarbonate by ammonia absorption by atomizing at a high pressure and carbonation by atomizing at a high pressure.

The method is to enlarge the surface area of the fine sodium chloride solution and to allow the atomized fine sodium chloride solution to contact ammonia gas in an ammoniator in an aerosol-mixed and convective manner. The fine sodium chloride solution rapidly dissolves ammonia gas to generate a sodium chloride solution containing ammonia, and then the atomized sodium chloride solution containing ammonia contacts carbon dioxide gas in the carbonizer in the same method as above to dissolve carbon dioxide rapidly. The following chemical reaction occurs, i.e. $NaCl+NH_3+CO_2+H_2O=NaHCO_3+NH_4Cl$, to convert sodium chloride into sodium bicarbonate. The solution containing sodium bicarbonate is thickened, followed by centrifuging dehydration to prepare sodium bicarbonate crystals or by high-speed stirring to prepare a crystal slurry of sodium bicarbonate.

VII. Sodium carbonate monohydrate is calcined by the drying column having two functions and two effects, and sodium bicarbonate is decomposed by a method of decomposing in a liquid state by atomizing and a granulating technique of brushing and scattering.

Figure 8:
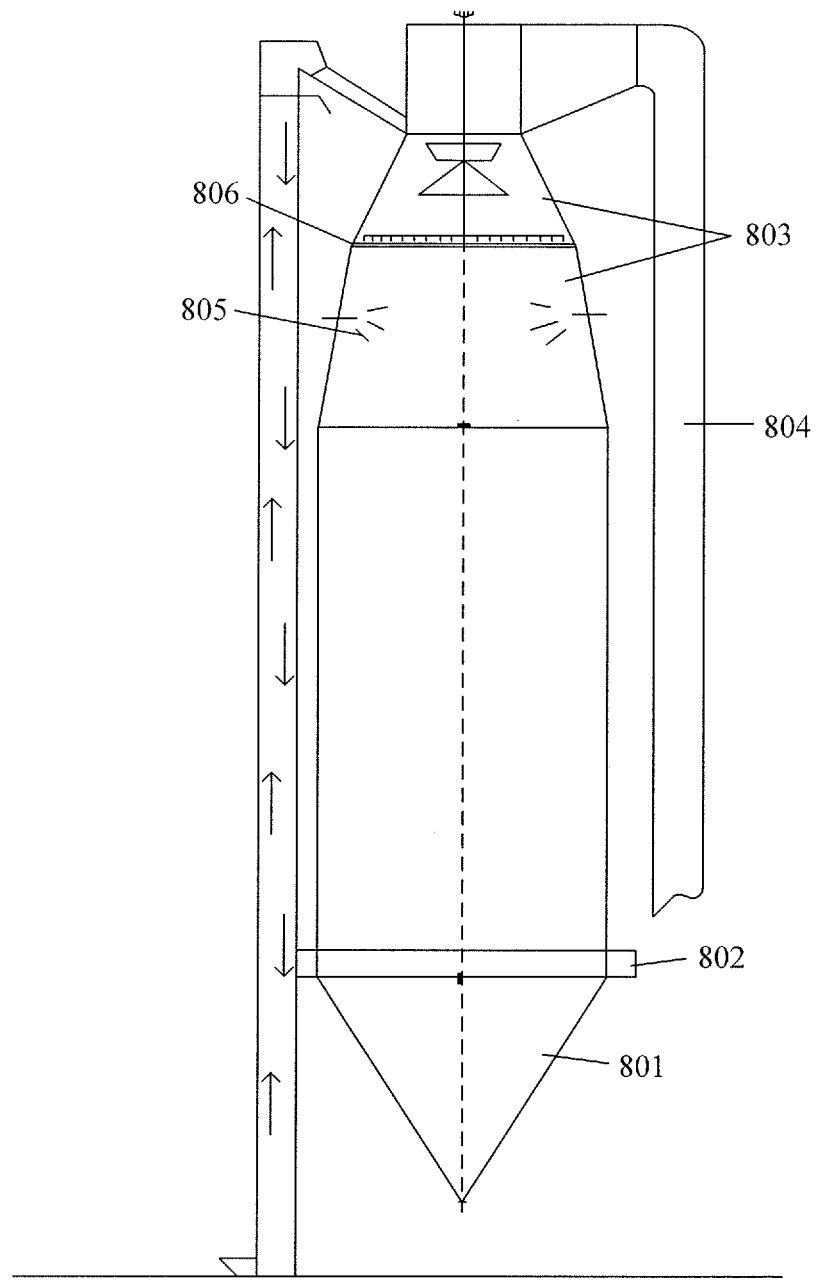
FIG. 8 is a schematic view of a drying column having two functions and two effects according to one embodiment of the invention.

The drying column having two functions and two effects is an upright column (as shown in FIG. 8), the height of which is determined according to the different production requirements. The bottom is a cone discharging funnel 801 and the upper part of the funnel is an annular air inlet 802. The top is a column cover 803 equipped with an induced air pipe 804 to extracted out the gas within the column. In the column, the top is equipped with a high-pressure spray gun 805 and a distributing tray 806 for brushing and scattering the material. Said "two functions" means that it can not only treat liquid raw materials by decomposition in a liquid state by atomizing at a high pressure, but also can treat solid raw materials by a granulating technique of brushing and scattering. Said "two effects" means that it can not only calcine and dry sodium carbonate, but also can calcine and decompose sodium bicarbonate. The operating principles are as follows. 1. Liquid raw material, i.e. a sodium bicarbonate slurry is pumped into the spray gun on the top of the column by a high-pressure pump as a spray by the pressure and falls slowly from the top of the column down. The spray contacts the rising hot gas from the bottom up to generate heat exchange during falling, thus the water in the spray material is rapidly evaporated, and a finished product is produced. The material is expanded to become hollow due to high pressure, and is prepared into the super-light hollow calcined soda. 2. Solid raw material, i.e. sodium carbonate monohydrate or sodium bicarbonate crystal is lifted up to the top of the column by a bucket elevator, and then fed to the material-distributing tray on the top of the column by the chute, followed by being scattered to the sieve tray on the top of the column after distribution. The material on the sieve tray is brushed and scattered by a material-distributing brush and then falls through meshes, and the material contacts the rising hot gas to generate heat exchange during falling. The fine material is rapidly dried or decomposed into the finished product, and the coarse material is sieved by a roll screen and then transferred to a feeding is line by a conveyor. After pulverization, the material is returned to the feed stock for repeating calcination. Fine materials fall down under the action of brushing and scattering by the material-distributing brush, and collide with and adhere to each other, then become the particle product when falling into the collection funnel. Waste gas from processing sodium carbonate crystal is pumped out via the induced air pipe on the top of the column, and is subjected to cyclone dedust and bag dedust, followed by being introduced to the self-dissolver as a hot gas for providing heat source. Exhausted gas from processing sodium bicarbonate crystal or a crystal slurry is extracted out via the induced air pipe on the top of the column, and then is subjected to cyclone dedust and bag dedust, followed by being provided for the process of carbonating by atomizing at a high pressure.

Example 3

Figure 9:
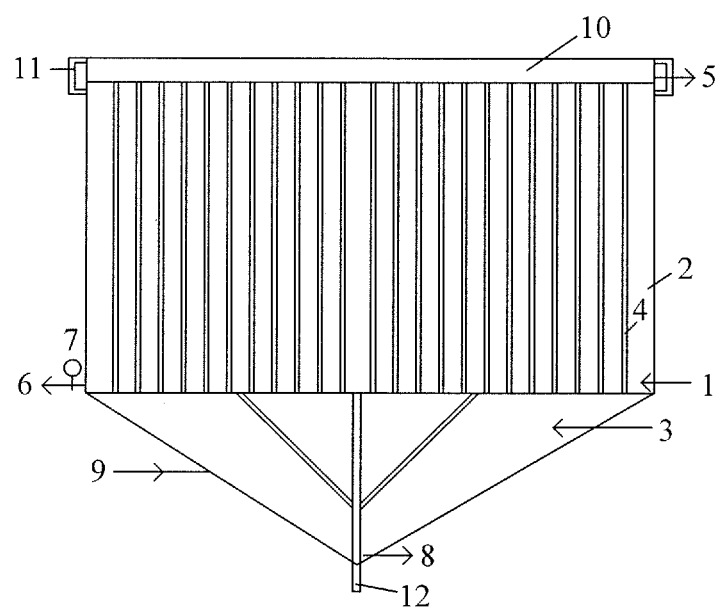
FIG. 9 is a schematic view of a tube-typed attaching crystallizer.

I. A natural soda solution is prepared by the same method as example 1, and is subjected to attaching crystallization to separate sodium carbonate decahydrate, except that the attaching crystallization is performed by cooling, and the attaching crystallizer is a tube-typed attaching crystallizer (referring to FIG. 9). The tube-typed attaching crystallizer comprises a crystallizing region 2 for accommodating the natural soda solution, and tubes 4 disposed in the crystallizing region. The crystallizing region 2 of the tube-typed attaching crystallizer is filled with the natural soda solution through the inlet 1 for the mother liquor of the natural soda, and a cooling water with a temperature of 10° C. to 12° C. is introduced into the cone region on the bottom of the crystallizer trough the inlet 3 for the cooling water, and rises upwards along tubes 4 and flows out from an overflow port 5. The natural soda solution in the crystallizing region is cooled by the cooling water recycled in the tubes, and the temperature and solubility thereof is continuously declined. Sodium carbonate having lower solubility in the natural soda solution firstly attaches to the tube walls and is crystallized as sodium carbonate decahydrate. The precipitated crystals attach to the tube walls as crystal seeds and the same molecules of the solutes are attracted to be attached thereon. When the crystals attached to the tube walls grow to a certain amount (determined by the U-shaped pressure gauge 7 disposed at the outlet 6 for the soda solution), the cooling water in the tubes 4 is discharged from the outlet 8 for the cooling water, and the remained solution is discharged from the outlet 6 for the soda solution and returned to the mother liquor of the natural soda.

Figure 10:
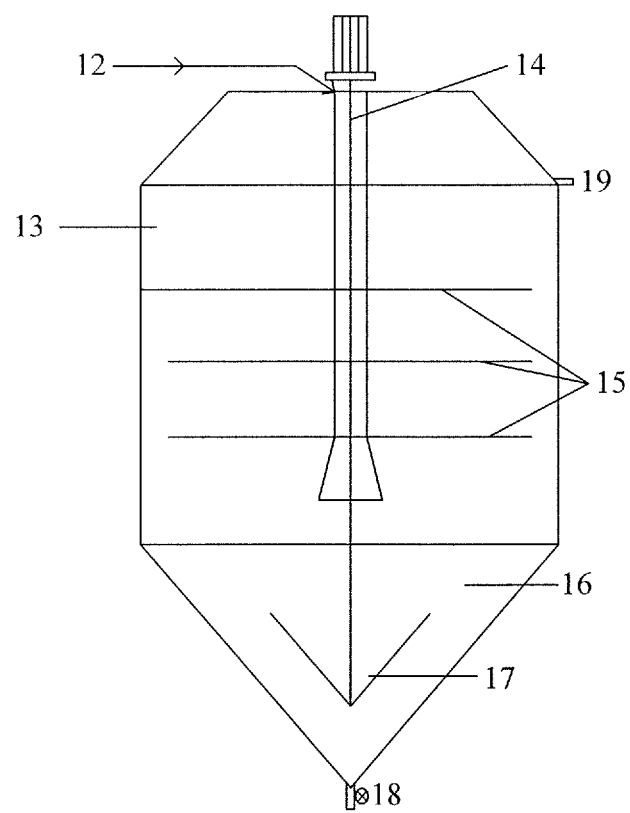
FIG. 10 is a schematic view of a crystallizer for sodium carbonate monohydrate.

II. A hot steam with a temperature of equal to or above 35.4° C. is introduced into the tube-typed attaching crystallizer, from which the remained solution and the cooling water have been discharged, through the inlet 9 for the hot steam. The hot steam flows through the tubes 4 to the gas-storing region 10 on the top of the tube-typed attaching crystallizer, and is introduced into the crystallizing region 2 through a gas-guiding pipe 11, then is discharged from the outlet 6 after heat recycling. The sodium carbonate decahydrate crystals attached to the tube walls are dissolved in the crystal water of theirselves heated by the hot steams inside and outside of the tubes, and the obtained solution is discharged from the outlet 12 and is fed into the crystallizer 13 as shown in FIG. 10.

III. The concentrated solution of self-dissolving sodium carbonate decahydrate is pumped to a centre sleeve 14 of the crystallizer 13 (referring to FIG. 10) through a pipe 12, the liquid level gradually rises up with the soda solution flowing to the bottom of the crystallizer 13 through the centre sleeve. During the rising, the soda solution is heated by the heating pipes 15 inside the crystallizer 13, and the temperature of the soda solutions rises up to 35.4° C.~109° C. Here, sodium carbonate monohydrate crystals are continuously precipitated, and drop to be stored in the cone 16 at the bottom is of the crystallizer 13 due to self-gravity. The crystal grains of the crystallized sodium carbonate monohydrate continuously grow under the action of the stirrer 17. Sodium carbonate monohydrate crystals are discharged from the outlet 18 intermittently when the storing amount thereof reaches a certain degree, and are fed to the following process after centrifuging dehydration. During crystallizing sodium carbonate monohydrate, the soda solution having a reduced concentration increases gradually in the crystallizer 13, and overflows after the surface thereof reaches the overflow port 19.

The sodium carbonate monohydrate crystals and the overflown remained solution after the described processes are further treated by the same methods as described in steps III to VII in example 2, so as to separate sodium chloride, soda and sodium sulphate from each other.

The combined process for preparing the calcined soda achieved by the invention decreases the requirement on raw materials and is suitable for processing most of natural soda minerals. By practical comparison, the process of the invention can not only decrease the investments on production facility (the investment on production facility is 1% of the investments in the common production process), but also greatly decrease energy consumption, simplify production process, shorten production period, utilize the natural resource sufficiently, greatly decrease the production cost, decrease manpower (only one tenth of the common production process), and achieve the requirement of environment friendly production.

What is claimed is:

1. A combined process for preparing a calcined soda from a natural soda containing a mixture of sodium chloride, soda and sodium sulphate, comprises:
   (a) preparing an aqueous solution of the natural soda;
   (b) separating sodium carbonate decahydrate crystals from the natural soda solution by using a separation method of attaching crystallization; and
   (c) treating the obtained sodium carbonate decahydrate crystals to obtain the calcined soda.

2. The combined process for preparing the calcined soda according to claim 1, wherein the separation method of attaching crystallization uses an attaching crystallizer having a netted fibre structure.

3. The combined process for preparing the calcined soda according to claim 2, wherein in step (c), the sodium carbonate decahydrate crystals obtained in step (b) are self-dissolved by heating, then crystallized at a temperature of $\geq 109°$ C. as anhydrous sodium carbonate crystals, which are further separated and calcined to prepare the calcined soda.

4. The combined process for preparing the calcined soda according to claim 3, wherein the calcination is performed in a calcining pipe where substances are brushed, scattered, blasted and calcined, which comprises:
   providing a hot blast with a wind pressure of 5000 Pa and a temperature of equal to or above 200° C. in the calcining pipe;
   introducing the substances into the calcining pipe;
   allowing the substances to be brushed, scattered, calcined and blown, followed by being rapidly dried and/or decomposed in the calcining pipe;
   recycling the substances having a high water content and a large particle size into the calcining pipe to perform brushing, scattering, calcinating and blowing;
   blowing the heavy calcined soda obtained after drying into an accumulation silo; and
   performing cyclone separation to dust-like substances to obtain a light calcined soda.

5. The combined process for preparing the calcined soda according to claim 2, which further comprises:
   a solution remained after the sodium carbonate decahydrate crystals have been separated out in step (b) is atomized at a high pressure, and $CO_2$ is introduced so that sodium carbonate therein is converted into sodium bicarbonate, which is crystallized and separated to obtain sodium bicarbonate crystals and a remained solution, or is stirred to obtain a sodium bicarbonate crystal slurry; and
   the obtained sodium bicarbonate crystals are calcined to prepare the calcined soda, and the obtained sodium bicarbonate crystal slurry is atomized at the high pressure and dried to prepare the calcined soda.

6. The combined process for preparing the calcined soda according to claim 5, wherein the remained solution after sodium bicarbonate crystals or sodium carbonate monohydrate crystals have been separated out is further treated, which comprises:
   concentrating the remained solution, performing attaching crystallization, and separating to prepare sodium sulphate decahydrate crystals;
   allowing the solution remained after the sodium sulphate decahydrate crystals have been separated out to absorb ammonia by atomizing at the high pressure, and to be carbonated by atomizing at the high pressure, so as to convert sodium chloride therein into sodium bicarbonate, which is crystallized and separated to obtain sodium bicarbonate crystals, or is stirred to obtain a sodium bicarbonate crystal slurry; and
   calcining the obtained sodium bicarbonate crystals to prepare the calcined soda, or allowing the sodium bicarbonate crystal slurry to be decomposed in a liquid state by atomizing at the high pressure and dried to prepare the calcined soda.

7. The combined process for preparing the calcined soda according to claim 6, wherein the attaching crystallization of the sodium sulphate decahydrate crystals is preformed at a solution concentration of 8-56.7% and a temperature of 0° C.-32.4° C.

8. The combined process for preparing the calcined soda according to claim 6, wherein the sodium sulphate decahydrate crystals are further naturally effloresced at a temperature of 0° C.-34° C. to prepare anhydrous sodium sulphate.

9. The combined process for preparing the calcined soda according to claim 5, wherein the pressure of a spray gun for the atomization at the high pressure is 20 kg/cm$^2$-60 kg/cm$^2$.

10. The combined process for preparing the calcined soda according to claim 5, wherein the calcination is performed in a calcining pipe where substances are brushed, scattered, blasted and calcined, which comprises:
   providing a hot blast with a wind pressure of 5000 Pa and a temperature of equal to or above 200° C. in the calcining pipe;
   introducing the substances into the calcining pipe;
   allowing the substances to be brushed, scattered, calcined and blown, followed by being rapidly dried and/or decomposed in the calcining pipe;
   recycling the substances having a high water content and a large particle size into the calcining pipe to perform brushing, scattering, calcinating and blowing;
   blowing the heavy calcined soda obtained after drying into an accumulation silo; and performing cyclone separation to dust-like substances to obtain a light calcined soda.

11. The combined process for preparing the calcined soda according to claim 1, wherein in step (c), the sodium carbonate decahydrate crystals obtained in step (b) are self-dissolved by heating, then recrystallized at a temperature of 34.5° C.-109° C. as sodium carbonate monohydrate crystals, which are further separated and calcined to prepare the calcined soda, or are naturally effloresced to prepare the calcined soda at a temperature of 0-34° C.; and a solution remained after the sodium carbonate decahydrate crystals have been separated out in step (b) is recycled to the natural soda solution.

12. The combined process for preparing the calcined soda according to claim 11, wherein the calcination is performed in a drying column having two functions and two effects.

13. The combined process for preparing the calcined soda according to claim 9, wherein the sodium sulphate decahydrate crystals are preferably self-dissolved by heating, then recrystallized at a temperature of 50° C.-100° C.

14. The combined process for preparing the calcined soda according to claim 11, further comprises:

performing concentration by evaporating and crystallization at a low temperature of 35.4° C.-50° C., so that sodium carbonate remained in a solution from which the sodium carbonate monohydrate crystals have been separated out is crystallized and separated as sodium carbonate monohydrate crystals, and a remained solution is obtained; and the further obtained sodium carbonate monohydrate crystals are calcined to prepare the calcined soda.

15. The combined process for preparing the calcined soda according to claim 14, wherein the calcination is performed in a drying column having to two functions and two effects.

16. The combined process for preparing the calcined soda according to claim 14, wherein the remained solution after sodium carbonate monohydrate crystals have been separated out is further treated, which comprises:

concentrating the remained solution, performing attaching crystallization, and separating to prepare sodium sulphate decahydrate crystals;

allowing the solution remained after the sodium sulphate decahydrate crystals have been separated out to absorb ammonia by atomizing at the high pressure, and to be carbonated by atomizing at the high pressure, so as to convert sodium chloride therein into sodium bicarbonate, which is crystallized and separated to obtain sodium bicarbonate crystals, or is stirred to obtain a sodium bicarbonate crystal slurry; and calcining the further obtained sodium bicarbonate crystals to prepare the calcined soda, or allowing the sodium bicarbonate crystal slurry to be decomposed in a liquid state by atomizing at the high pressure and dried to prepare the calcined soda.

17. The combined process for preparing the calcined soda according to claim 16, wherein the attaching crystallization of the sodium sulphate decahydrate crystals is preformed at a solution concentration of 8-56.7% and a temperature of 0° C.-32.4° C.

18. The combined process for preparing the calcined soda according to claim 16, wherein the sodium sulphate decahydrate crystals are further naturally effloresced at a temperature of 0° C.-34° C. to prepare anhydrous sodium sulphate.

19. The combined process for preparing the calcined soda according to claim 16, wherein the pressure of a spray gun for the atomization at the high pressure is 20 kg/cm$^2$-60 kg/cm$^2$.

20. The combined process for preparing the calcined soda according to claim 16, wherein the separation method of attaching crystallization uses an is attaching crystallizer having a netted fiber structure.

21. The combined process for preparing calcined soda according to claim 16, wherein the calcination is performed in a calcining pipe where substances are brushed, scattered, blasted and calcined, which comprises:

providing a hot blast with a wind pressure of 5000 Pa and a temperature of equal to or above 200° C. in the calcining pipe;

introducing the substances into the calcining pipe;

allowing the substances to be brushed, scattered, calcined and blown, followed by rapid drying and/or decomposition in the calcining pipe;

recycling the substances having a high water content and large particle size into the calcining pipe to perform brushing, scattering, calcinating and blowing;

blowing the heavy calcined soda obtained after drying into an accumulation silo; and performing cyclone separation to dust-like substances to obtain a light calcined soda.

22. The combined process for preparing calcined soda according to claim 16, wherein the calcination is performed in a drying column having two functions and two effects.

23. The combined process for preparing calcined soda according to claim 16, wherein the decomposition in a liquid state by atomizing at the high pressure and drying are performed in a drying column having two functions and two effects.

24. The combined process for preparing the calcined soda according to claim 1, wherein the natural soda solution has a concentration of 6%-32.9% and a temperature of 0° C.-35° C.

25. The combined process for preparing the calcined soda according to claim 1, wherein the natural soda solution has a concentration of 5.9%-31.3% and a temperature of −2.1° C.-32° C.

26. The combined process for preparing the calcined soda according to claim 25, wherein the natural soda solution preferably has a temperature of −2.1° C.-20° C.

27. The combined process for preparing the calcined soda according to claim 1, wherein the separation method of attaching crystallization uses a tube-typed attaching crystallizer having tubes disposed therein.

28. The combined process for preparing the calcined soda according to claim 27, wherein a cooling water with a temperature of 10° C.-12° C. is introduced in the tubes to cool the natural soda solution in the tube-typed attaching crystallizer.

29. The combined process for preparing the calcined soda according to claim 27, wherein in step (c), the sodium carbonate decahydrate crystals obtained in step (b) are self-dissolved by heating in the tube-typed attaching crystallizer to obtain a concentrated solution of sodium carbonate.

30. The combined process for preparing the calcined soda according to claim 29, wherein the concentrated solution of sodium carbonate is crystallized at a temperature of 35.4° C.-109° C. and separated to obtain sodium carbonate monohydrate crystals and a remained solution, and the sodium carbonate monohydrate crystals are calcined to prepare the calcined soda.

31. The combined process for preparing the calcined soda according to claim 30, wherein the calcination is performed in a drying column having two functions and two effects.

32. The combined process for preparing the calcined soda according to claim 30, the remained solution after sodium carbonate monohydrate crystals have been separated out is further treated, which comprises:

concentrating the remained solution, performing attaching crystallization and separating to prepare sodium sulphate decahydrate crystals;

allowing the solution remained after the sodium sulphate decahydrate crystals have been separated out to absorb ammonia by atomizing at a high pressure, and to be carbonated by atomizing at a high pressure, so as to convert sodium chloride therein into sodium bicarbonate, which is crystallized and separated to obtain sodium bicarbonate crystals, or is stirred to obtain a sodium bicarbonate crystal slurry; and calcining the obtained sodium bicarbonate crystals to prepare the calcined soda, or allowing the sodium bicarbonate crystal slurry to be decomposed in a liquid state by atomizing at the high pressure and dried to prepare the calcined soda.

33. The combined process for preparing the calcined soda according to claim 32, wherein the calcination is performed in a drying column having two functions and two effects.

* * * * *